United States Patent
Beach et al.

(10) Patent No.: US 9,018,280 B2
(45) Date of Patent: *Apr. 28, 2015

(54) LOW-DENSITY MOLDING COMPOUND

(75) Inventors: Brian A. Beach, Detroit, MI (US);
Probir K. Guha, Troy, MI (US); Brad Haskell, Lake Orion, MI (US); Michael J. Siwajek, Rochester Hills, MI (US)

(73) Assignee: Continental Structural Plastics, Inc., Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/764,345

(22) Filed: Apr. 21, 2010

(65) Prior Publication Data

US 2010/0204360 A1    Aug. 12, 2010

Related U.S. Application Data

(63) Continuation of application No. 11/434,417, filed on May 15, 2006, now Pat. No. 7,700,670.

(60) Provisional application No. 60/680,893, filed on May 13, 2005.

(51) Int. Cl.
*C08K 7/16* (2006.01)
*C08K 9/00* (2006.01)
*C08G 18/83* (2006.01)
*C08K 7/20* (2006.01)
*C08G 59/14* (2006.01)
*C08G 64/42* (2006.01)
*C08K 3/26* (2006.01)
*C08K 7/02* (2006.01)

(52) U.S. Cl.
CPC ............... *C08G 18/837* (2013.01); *C08K 7/20* (2013.01); *C08G 59/1433* (2013.01); *C08G 64/42* (2013.01); *C08K 3/26* (2013.01); *C08K 7/02* (2013.01); *C08K 2003/265* (2013.01)

(58) Field of Classification Search
CPC ......... C08L 35/06; C08L 67/06; C08L 67/07; C08K 3/40; C08K 3/0033; C08K 7/02; C08K 7/16; C08K 7/18; C08K 7/20; C08K 7/28
USPC .......... 523/223, 217, 444, 447, 153; 428/402, 428/404–406
See application file for complete search history.

(56) References Cited

U.S. PATENT DOCUMENTS

| | | | |
|---|---|---|---|
| 3,711,432 A * | 1/1973 | Shah | 523/509 |
| 4,222,929 A | 9/1980 | Shanoski et al. | |
| 4,260,358 A | 4/1981 | Mehnert | |
| 4,262,100 A | 4/1981 | Dunleavy et al. | |
| 4,293,686 A | 10/1981 | Gardner | |
| 4,374,238 A | 2/1983 | Shanoski | |
| 4,416,926 A * | 11/1983 | Maglio | 428/31 |
| 4,451,610 A | 5/1984 | Collister | |
| 4,643,126 A | 2/1987 | Wilkinson et al. | |
| 5,066,693 A | 11/1991 | Gupta | |
| 5,100,935 A | 3/1992 | Iseler et al. | |
| 5,220,047 A | 6/1993 | Pohl et al. | |
| 5,268,400 A | 12/1993 | Iseler et al. | |
| 5,310,686 A | 5/1994 | Sawyers et al. | |
| 5,376,721 A | 12/1994 | McGarry et al. | |
| 5,412,003 A * | 5/1995 | Akiyama et al. | 523/513 |
| 5,521,232 A | 5/1996 | Gynn et al. | |
| 5,854,317 A | 12/1998 | Rinz | |
| 5,998,510 A | 12/1999 | Butler | |
| 6,040,391 A | 3/2000 | Rinz | |
| 6,440,534 B1 | 8/2002 | Wilson | |
| 6,521,162 B2 * | 2/2003 | Colley et al. | 264/322 |
| 6,531,222 B1 * | 3/2003 | Tanaka et al. | 428/402 |
| 6,558,605 B1 | 5/2003 | Wilson | |
| 6,682,811 B1 | 1/2004 | Wilson | |
| 6,780,923 B2 * | 8/2004 | Guha et al. | 524/539 |
| 6,822,058 B1 | 11/2004 | Kramer et al. | |
| 6,878,782 B2 | 4/2005 | Merfeld et al. | |
| 6,977,115 B1 | 12/2005 | Wilson | |
| 7,268,182 B2 | 9/2007 | Sunkara et al. | |

(Continued)

FOREIGN PATENT DOCUMENTS

FR    2914216 A1    10/2008
JP    2002179907 A    6/2002

(Continued)

OTHER PUBLICATIONS

"Unsaturated Polyester." [online] Britannica [Jun. 11, 2013] Retrieved online <http://www.britannica.com/EBchecked/topic/1551220/unsaturated-polyester>.*
Westlund et al. "Applying Appearance Standards to Light Reflection Models." University of Oregon. pp. 501-510 (2001).*
"Genuine Mercedes Benz Assessories." pp. 1-15 (2011).*
Richard et al, Polydienes possessing terminal ionic groups part 1 preparation of polydeines with terminal quaternary ammonium groups, Br. Polym. J., Sep. 1984, 117-122, vol. 16 Issue 3.

(Continued)

*Primary Examiner* — Hannah Pak
(74) *Attorney, Agent, or Firm* — Blue Filament Law PLLC; Avery N. Goldstein

(57) ABSTRACT

A molding composition formulation includes a thermoset cross-linkable 12 to 45 micron polymeric resin. Hollow glass microspheroids are present from 2 to 12 total weight percent. An article formed from such a composition is further strengthened by the addition of a surface activating agent bonded to the surface of the glass microspheroids. Conventional particulate fillers when added to an inventive formulation provide enhanced performance when the filler particle has a size sufficiently small to insert within adjacent microspheroid interstitial voids. An unsaturated polyester resin so formed is particularly well suited for the formation of sheet molding compound formulations.

27 Claims, 2 Drawing Sheets

(56) References Cited

U.S. PATENT DOCUMENTS

| | | |
|---|---|---|
| 7,524,547 B2 * | 4/2009 | Beach et al. .................. 428/36.6 |
| 7,700,670 B2 * | 4/2010 | Beach et al. .................. 523/223 |
| 7,829,637 B2 * | 11/2010 | Guha et al. ............... 525/440.06 |
| 2002/0143094 A1 * | 10/2002 | Conroy et al. ................. 524/445 |
| 2003/0092823 A1 * | 5/2003 | Steinhausler et al. ........ 524/494 |
| 2003/0153643 A1 | 8/2003 | Jin et al. |
| 2004/0081827 A1 | 4/2004 | Datta et al. |
| 2004/0152803 A1 * | 8/2004 | Ahsan ........................... 523/400 |
| 2004/0220335 A1 | 11/2004 | Damman et al. |
| 2004/0262801 A1 | 12/2004 | Hojaji et al. |
| 2005/0007657 A1 | 1/2005 | Sakai et al. |
| 2005/0014533 A1 | 1/2005 | Cave et al. |
| 2005/0043443 A1 | 2/2005 | Van Mullekom et al. |
| 2005/0054761 A1 | 3/2005 | Guha et al. |
| 2005/0137307 A1 | 6/2005 | Yeager |
| 2005/0143533 A1 | 6/2005 | Raviola et al. |
| 2005/0159511 A1 | 7/2005 | Kramer |
| 2005/0182205 A1 * | 8/2005 | Guha et al. .................... 525/440 |
| 2006/0199893 A1 | 9/2006 | Schrempf et al. |
| 2006/0201550 A1 | 9/2006 | Blyth et al. |
| 2006/0270760 A1 * | 11/2006 | Desai ............................ 523/219 |
| 2007/0066721 A1 | 3/2007 | Kramer et al. |
| 2014/0275336 A1 * | 9/2014 | Beach et al. .................. 523/223 |

FOREIGN PATENT DOCUMENTS

| | | |
|---|---|---|
| MX | PA01001579 A | 4/2002 |
| MX | PA04003917 A | 9/2004 |
| MX | PA03007027 A | 10/2004 |
| WO | WO-9961236 A1 | 12/1999 |
| WO | WO-9961237 A1 | 12/1999 |
| WO | WO-0037241 A1 | 6/2000 |
| WO | WO-0037242 A1 | 6/2000 |
| WO | WO-0037243 A1 | 6/2000 |
| WO | WO-0062961 A1 | 10/2000 |
| WO | WO-2006133433 A2 | 12/2006 |

* cited by examiner

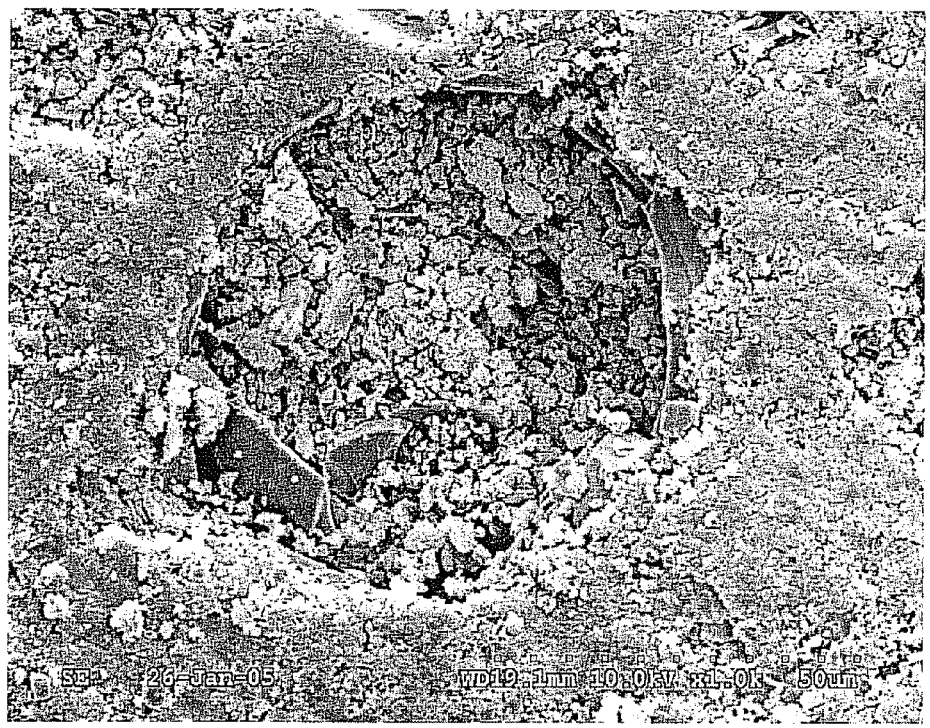
Figure 1. Sanded 85 micron hollow glass micro-sphere

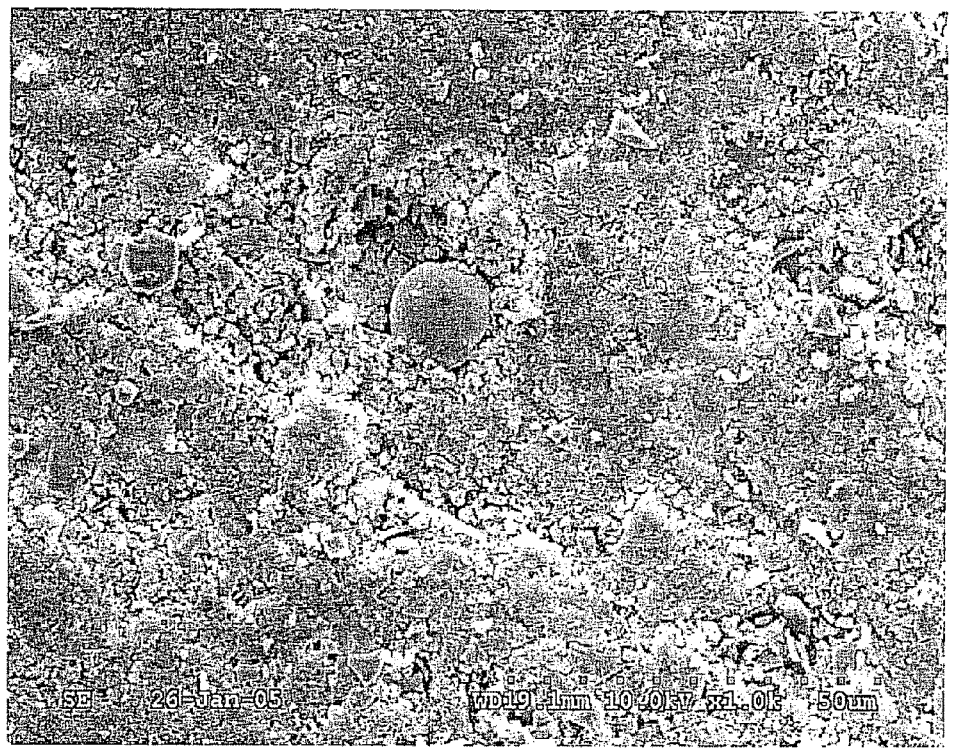
Figure 2. Sanded 18 micron hollow glass micro-sphere (untreated)

LOW-DENSITY MOLDING COMPOUND

RELATED APPLICATION

This application is a continuation of U.S. utility patent application Ser. No. 11/434,417 filed May 15, 2006 now U.S. Pat. No. 7,700,670; which in turn claims priority of U.S. Provisional Patent Application Ser. No. 60/680,893 filed May 13, 2005; these are hereby incorporated by reference.

FIELD OF THE INVENTION

The present invention in general relates to low density sheet molding compounds and in particular, to a low-density sheet molding compound sandable to a high sheen surface.

BACKGROUND OF THE INVENTION

In order to reduce the density of a sheet molding compound (SMC) or bulk molding compound (BMC), high-density inorganic fillers, such as calcium carbonate, are removed from the formulation and replaced with thermoplastic in an effort to maintain surface quality characteristics. Another approach common to the field is to remove a portion of the inorganic filler and replace some of the inorganic filler with the industry standard SMC-1 hollow glass microspheres. Spherical particulate under processing conditions have a tendency to become displaced from the molding compound matrix. Additionally, under the stresses associated with sanding a molded article, such hollow glass spheres have a tendency to rupture, leaving a cavity in the molded article that is amenable to disintegration. The ruptured hollow glass sphere is manifest in a painted article as a paint pop that effectively destroys the surface finish. Due to these problems, hollow glass spheres have not been acceptable in SMC or BMC molded articles requiring a class "A" surface finish as defined by Powder Prime Patent. As class "A" surfaces are routinely required in vehicle components, the ability to form a low density class "A" SMC article would lower the vehicle weight and thereby increase fuel efficiency.

Thus, there exists a need for a low-density class "A" SMC or BMC containing hollow glass microspheres that retains class "A" surface finish characteristics.

SUMMARY OF THE INVENTION

A molding composition formulation according to the present invention includes a thermoset cross-linkable polymeric resin. Hollow glass microspheroids are present at 2 to 12 total weight percent. Solid glass microspheroids having a mean diameter of from 16 to 35 microns are particularly effective. An article formed from such a composition is further strengthened by the addition of a surface activating agent bonded to the surface of the glass microspheroids. Additionally, conventional particulate fillers when added to an inventive formulation provide enhanced performance when the filler particle has a size sufficiently small to insert within adjacent microspheroid interstitial voids.

A process for producing an article from a molding composition formulation and retaining surface quality includes adding a surface activating agent coated glass microspheroid having a mean particle diameter of from 16 to 35 microns to a molding composition formulation containing a thermoset cross-linkable polymeric resin. Upon allowing sufficient time for the resin to cross link, a molded article is produced with retention of high surface quality. An unsaturated polyester resin is particularly well suited for the formation of sheet molding compound formulations.

BRIEF DESCRIPTION OF THE DRAWINGS

FIG. 1 is a scanning electron micrograph of a conventional 85 micron hollow glass microsphere shattered in the course of sanding the plateau surface. The distance between adjacent dots corresponds to 5 microns; and FIG. 2 is a scanning electron micrograph of the same base SMC formulation containing an 18 micron hollow glass microsphere subjected to the same sanding regimen as that depicted in FIG. 1. The distance between adjacent dots corresponds to 5 microns.

DETAILED DESCRIPTION OF THE INVENTION

The present invention has utility as a molding compound. According to the present invention, a microspheroid having a mean diameter of between 10 and 120 microns is introduced into a base SMC or BMC formulation to afford a class "A" surface finish.

As used herein a microspheroid is defined to include a hollow microsphere or a solid bead having an aspect ratio of between two normal diameters of between 1 and 1.6. Typically, a spheroid particle is formed of glass or a thermoplastic material.

A class "A" surface as used herein is defined to be a cured SMC or BMC material having a linear shrinkage of ±0.06%. Such a material containing unsaturated polyester resin, thermoplastic additives, organic peroxides, inhibitor, filler, mold release and pigment is sold by ThyssenKrupp Budd under the trade name TCA®.

Preferably, the microspheroids have a mean diameter of between 12 and 45 microns. Most preferably, the microspheroids have an outer dimension of between 16 and 35 microns. Typically, microspheroids are loaded into a base SMC or BMC class "A" formulation from 2 to 12 total weight percent of the resulting formulation. Preferably, the microspheroids are present from 4 to 6 total weight percent of the resulting SMC or BMC formulation. The specific amount of microspheroids added into a given molding composition formulation is dependent on factors including desired article density, microspheroid size dispersion and mean particle dimension, required article strength, required article shrinkage, and required article surface smoothness.

In a particularly preferred embodiment of the present invention, the microspheroids are pretreated with a surface coating adherent to the microspheroid surface.

A microspheroid surface is readily derivatized to bond to a surrounding resin matrix during cure. The resulting article exhibits improved physical properties.

One type of surface derivative for a microspheroid is a heteroatom functionally terminated thermoplastic coating. The heteroatom containing terminus illustratively includes a tertiary amine-, hydroxyl-, imine- or cyano-moiety. It is appreciated that such moieties under appropriate cure conditions known to the art are able to react with matrix resin components during cure to further strengthen a cured article. Tertiary amine terminated thermoplastic are readily prepared. D. H. Richards, D. M. Service, and M. J. Stewart, *Br. Polym. J.* 16, 117 (1984). A representative tertiary amine terminated thermoplastic is commercially available under the trade name ATBN 1300 X 21 from Noveon.

A surface activating agent that bonds to a glass microspheroid is an alkoxysilane where the silane is reactive with the silica surface of the microspheroid. Representative alkoxysilane surface activating agents for the microspheroid illustratively include: 3-aminopropyltrimethoxysilane, 3-aminopropyltriethoxysilane, 3-glycidoxypropyltrimethoxysilane, 3-glycidoxypropyltriethoxysilane, (3-glycidoxypropyl) bis (trimethylsiloxy)methylsilane, (3-glycidoxypropyl)methyldiethoxysilane, (3-glycidoxypropyl) dimethylethoxysilane, (3-glycidoxypropyl)methyldimethoxysilane, methacryloxymethyltriethoxysilane, methacryloxymethyltrimethoxysilane, methacryloxypropyldimethylethoxysilane, methacryloxypropyldimethylmethoxysilane, ethacryloxypropylmethyldimethoxysilane, methacryloxypropyltriethoxysilane, methoxymethyltrimethylsilane, 3-methoxypropyltrimethoxysilane, 3-methacryloxypropyldimethylchlorosilane, methacryloxypropylmethyldichlorosilane, methacryloxypropyltrichlorosilane, 3-isocyanatopropyldimethylchlorosilane, 3-isocyanatopropyltriethoxysilane, bis(3-triethoxysilylpropyl) tetrasulfide, and combinations thereof. More preferably, the silane surface activating agent includes an ethenically unsaturated moiety that is reactive under free radical cross-linking conditions so as to covalently bond with the hollow glass microsphere to the surrounding SMC or BMC class "A" matrix.

Alternatively, it is appreciated that microspheroid surface activating agent is readily mixed into the pre-cured SMC or BMC formulation and hollow glass microspheres added thereto to induce microsphere activation prior to initiation of matrix cure. Typically, the surface activating agent is present in concentrations of about 0.05 to 0.5 grams of surface activating agent per gram of microspheres.

A principal component of an SMC or BMC formulation is a cross-linkable polymer resin such as an unsaturated polyester resin or vinyl ester resin. The prepolymer polymeric resin has a molecular weight on average of typically between 400 and 100,000 Daltons. The polyester prepolymer resins typically represent condensation products derived from the condensation of unsaturated dibasic acids and/or anhydrides with polyols. It is appreciated that the saturated di- or polyacids are also part of the condensation process to from polyester prepolymers with a lesser equivalency of reactive ethylenic unsaturation sites. Typical SMC and BMC formulations are described in U.S. Pat. Nos. 4,260,358; 4,643,126; 5,100,935; 5,268,400; 5,854,317 and 6,780,923. A particularly preferred class "A" SMC formulation is detailed in pending U.S. patent application Ser. No. 11/037,908 filed Jan. 18, 2005.

Vinyl ester resins are also typically employed in SMC or BMC formulations as a polymeric resin. Vinyl ester prepolymer resins are typically the reaction product of an epoxy resin with a carboxylic acid having a single ethylenic unsaturation. Specific vinyl ester resins commonly used are the reaction product of epoxy functionalized bisphenol A with an acrylic acid. As a result of the difference in prepolymer synthesis, the vinyl ester resin prepolymers are typically associated with terminal ethylenic unsaturations while polyester resin prepolymers predominantly have ethylenic unsaturations internal to the prepolymer backbone.

The polymeric resin prepolymer is suspended, and preferably dissolved, in an ethylenically unsaturated monomer that copolymerizes with the resin during the thermoset process. It is appreciated that more than one type of monomer can be used in a molding composition. The monomer provides benefits including lower prepolymer viscosity and thermosetting without formation of a volatile byproduct. Monomer is typically present up to 18.5 total weight percent of a molded article.

A typical molding composition includes a free radical initiator to initiate cross-linking between the polymeric prepolymer resin with itself or with ethylenically unsaturated monomer, if present. A free radical initiator is typically chosen to preclude significant cross-linking at lower temperature so as to control the thermoset conditions. Conventional free radical polymerization initiators contain either a peroxide or azo group. Peroxides operative herein illustratively include benzoyl peroxide, cyclohexanone peroxide, ditertiary butyl peroxide, dicumyl peroxide, tertiary butyl perbenzoate and 1,1-bis(t-butyl peroxy) 3,3,5-trimethylcyclohexane. Azo species operative herein illustratively include azobisisobutyronitrile and t-butylazoisobutyronitrile. While the quantity of free radical polymerization initiator present varies with factors such as desired thermoset temperature and decomposition thermodynamics, an initiator is typically present from 0.1 to 3 total weight percent. In order to lessen cross-linking at temperatures below the desired thermoset temperature, a polymerization inhibitor is often included in base molding formulations. Hydroquinone and t-butyl catechol are conventional inhibitors. An inhibitor is typically present between 0 and 1 total weight percent.

The inventive molding composition preferably includes a particulate filler. Particulate fillers operative in such molding compositions illustratively include calcium carbonate, calcium silicate, alumina, ATH, silica, talcs, dolomite, vermiculite, diatomaceous earth, kaolin clay, graphite, metal and combinations thereof. Factors relevant in the choice of a particulate filler illustratively include filler cost, resultant viscosity of flow properties, resultant shrinkage, surface finish weight, flammability, electrical conductivity, and chemical resistance of the thermoset formulation. Particulate filler typically accounts from 0 to 80 weight percent of the molding composition total weight. Typical filler sizes are from 0.1 to 50 microns.

In a preferred embodiment, the filler particle size is matched to that of the microspheroid such that interstitial filling of voids associated with one of the filler or microspheroids is filled by the other. More preferably, the microspheroids are larger than the filler particle size to an extent that a filler particle can reside in an interstice between closely packed microspheroids. By way of example, four coplanar 18 micron solid glass microspheroids packed in an article formed from an inventive molding composition matrix to create a 7.4 micron diameter interstice wherein four conventional 85 micron glass spheres are packed together to yield a 35 micron diameter interstice. A calcium carbonate filler having a mean 5 micron diameter is well suited to fill interstitial spaces formed between microspheroids of the present invention. One of skill in the art can readily calculate interstitial dimensions by geometric techniques associated with crystallography. Assuming a microspheroid average radius of $\bar{r}$ for a group of contiguous microspheroids forming a four spheroid intersective interstice, the size of a filler particle capable of filling the interstice is less than or equal to a diameter D given by:

$$D \leq 2\sqrt{2\bar{r}^2} - 2\bar{r}$$

While not intending to be bound by a particular theory, it is surmised that interstitial dispersion of small particles within a grouping of larger particles inhibits formation of an inhomogenous region rich in filler. Inhomogenous filler regions with comparatively weak interactions with a surrounding cured matrix are believed to promote crack propagation and thereby weaken the resulting article.

It is appreciated that curable compositions other than SMCs and BMCs benefit from the inclusion of microspheroids sized to incorporate conventional filler particles into interstices between adjacent microspheroids. A microspheroid-filler size ratio to provide interstitial packing is employed in curable compositions also illustratively including epoxies, polyurethanes and polyureas.

A fiber filler is typically added to provide strength relative to a particulate filler. Fiber fillers operative herein illustratively include glass, carbon, polyimides, polyesters, polyamides, and natural fibers such as cotton, silk, and hemp. Preferably, the fiber filler is glass fiber in the form of chopped glass strands. More preferably, chopped glass strands are provided in lengths ranging from 5 to 50 millimeters. Fiber fillers are typically present from 0 to 80 total weight percent.

A mold release agent is typically provided to promote mold release. Mold releases include fatty acid salts illustratively including oleates, palmitates, sterates of metal ions such as sodium, zinc, calcium, magnesium, and lithium. A mold release is typically present from 0 to 5 total weight percent.

A low profile additive is optionally provided to improve surface properties and dimensional stability of a resulting molded product. Low profile additives illustratively include thermoplastics and elastomers such as polyethylene, polystyrene, polyvinyl toluene, polyacrylates, polyethylene ether polymers, polyphenylene oxide polymers, and combinations thereof. Copolymers operative as low profile additives include the above-recited polymers in addition to copolymers of the same including butadiene, acrylonitrile, and vinyl chloride. Low profile additives are typically present from 0 to 50 total weight percent and more often from 5 to 40 total weight percent.

A nanocomposite clay is lipophilic and has domains of a size that do not contribute to the molded article surface roughness. An alkyl quaternary ammonium bentonite nanocomposite clay operative herein is commercially available (Southern Clay Products, CLOISITE® 10A). Clay domains are on the order of 50 to 150 nanometers and have a platelet thickness of one to 10 nanometer and are optionally used alone, or in combination with a polymeric moisture reducing additive to enhance the processability of an inventive formulation while decreasing the moisture absorption rate. Such nanocomposite clay is typically present up to 10 total weight percent.

It is appreciated that the present invention optionally also incorporates additional additives illustratively including flame retardants, plasticizers, colorants, and other processing additives conventional to the art.

Molding compositions of the present invention are well suited for the rapid production of molded composite articles that have a class "A" finish and a lower density than that achieved with conventional SMC-1 hollow glass microspheres or the replacement of inorganic fillers with thermoplastic. The present invention is particularly well suited for the production of a variety of products illustratively including bumper beams, vehicle door panel components, automotive floor components, spoilers and hoods; and various industrial and consumer product housings.

The reduction of article density with the maintenance of surface finish properties of a class "A" article is achieved by allowing for the addition of lower density fiber and particulate fillers. Preferably, a sheet molding composition according to the present invention has a density of less than 1.65. Unlike the use of conventional 85 micron hollow glass microspheres that collapse under stress, the inventive microspheroids are preferably surface bonded to the resin matrix. This coupled with interstitial fill with matched size fillers reduces the structural demands on the filler and allows less rigorous demands on the filler properties.

The present invention is further illustrated with respect to the following non-limiting examples:

Example 1

18 micron outer diameter glass microspheroids are mixed into a conventional class "A" sheet molding compound formulation containing unsaturated polyester resin, thermoplastic additives, organic peroxides, inhibitor, calcium carbonate filler, mold release and pigment, as sold by ThyssenKrupp Budd under the trade name TCA®. The resulting formulation is cured into a plaque having dimensions of 20 cm×20 cm×0.5 cm.

Comparative Example

Example 1 was repeated with the replacement of the 18 micron glass microspheroids with industry standard SMC-1 hollow glass microspheres having an average particle diameter of 85 microns.

Example 2

The plaques of Example 1 and the comparative example were sanded with a hand orbital sander having a clean piece of 300 grit sandpaper over the surface for three minutes. A central disk of plaque having a diameter of 1 cm was cut from the plaque and shadowed with platinum-gold alloy. The resulting shadowed sample was subjected to scanning electron microscopy. FIG. 1 depicts the comparative 85 micron hollow glass microsphere that is noted to have shattered, leaving an optically perceptible defect. In contrast, the sanded 18 micron glass microspheroid containing plaque, per Example 1, is intact and therefore retains class "A" status while reducing the overall density of the plaque compared to a comparable plaque formed from TCA® lacking hollow glass microspheroids.

Example 3

10 micron solid glass microspheroids are dispersed in water (33 percent weight by weight). A methanol solution of 3-isocyanatopropyltriethoxysilane (10% silane by weight) is combined with the glass microsphere dispersion such that there are 20 silane molecules per each glass microspheroid in the dispersion. The solution is stirred in a polypropylene beaker overnight. The surface activated glass spheres are decanted and dried before inclusion in the conventional sheet molding compound of Example 1 in place of the 18 micron glass microspheroids. Following sanding of the resulting plaque, cured SMC matrix was noted to wet the glass microspheroid surface, with micrographs being comparable to those depicted in FIG. 2.

Patent documents and publications mentioned in the specification are indicative of the levels of those skilled in the art to which the invention pertains. These documents and publications are incorporated herein by reference to the same extent as if each individual document or publication was specifically and individually incorporated herein by reference.

The invention claimed is:
1. A molding composition formulation comprising:
a matrix of thermoset SMC or BMC cross-linkable polymeric resin of unsaturated polyester resin or vinyl ester resin;

a fiber filler;
a low profile additive;
hollow glass microspheroids with a mean diameter from 16 to 35 microns;
a surface activating agent molecules covalently bonded to each of said glass microspheroids, said surface activating agent molecules being alkoxysilanes and have ethenically unsaturated moiety that is reactive under free radical cross-linking conditions so as to covalently bond said hollow glass microspheroids to a surrounding matrix of said resin; and
a particulate filler, wherein said particulate filler has a particle size that is less than or equal to the mean diameter of said hollow glass microspheroids, wherein the formulation matrix is cured and the surface activating agent is present in concentration of about 0.05 to 0.5 grams of said surface activating agent per gram of hollow glass microspheroids.

2. The formulation of claim 1, wherein said glass microspheroids are present from 2 to 12 total weight percent of the formulation.

3. The formulation of claim 1 further comprising a mold release agent.

4. The formulation of claim 1 further comprising an alkyl ammonium bentonite nanocomposite clay.

5. The formulation of claim 1 wherein said wherein said particulate filler is calcium carbonate.

6. The formulation of claim 1 wherein said resin is said unsaturated polyester resin.

7. The formulation of claim 1 cured to form an article, said article is one of a vehicle door panel component, vehicle spoiler, a vehicle hood, an industrial product housing, or a consumer product housing.

8. The formulation of claim 1 wherein said particulate filler is only calcium carbonate.

9. The formulation of claim 1 wherein said particulate filler is only kaolin clay.

10. The formulation of claim 1 wherein said particulate filler are both calcium carbonate and kaolin clay.

11. The formulation of claim 4 wherein said particulate filler is calcium carbonate and said alkyl ammonium bentonite nanocomposite clay is present.

12. The formulation of claim 4 wherein said particulate filler is calcium carbonate and kaolin clay, and said alkyl ammonium bentonite nanocomposite clay is present.

13. The formulation of claim 1 wherein said particulate filler is calcium carbonate having a mean particle diameter of 5 microns.

14. A product comprising:
a molding composition formulation composed of a matrix of a thermoset SMC or BMC cross-linkable polymeric resin of unsaturated polyester resin or vinyl ester resin;
a fiber filler;
a low profile additive;
hollow glass microspheroids with a mean diameter from 16 to 45 microns;
a surface activating agent molecules covalently bonded to each of said hollow glass microspheroids, said plurality of surface activating agent molecules being alkoxysilanes and have ethenically unsaturated moiety that is reactive under free radical cross-linking conditions so as to covalently bond said hollow glass microspheroids to a surrounding matrix of said resin; and
a particulate filler wherein said particulate filler has a particle size that is less than or equal to the mean diameter of said hollow glass microspheroids; the formulation matrix cured in the form of an article having a high sheen surface, wherein the surface activating agent is present in concentration of about 0.05 to 0.5 grams of said surface activating agent Per gram of hollow glass microspheroids.

15. The product of claim 14 wherein said article is one of a vehicle door panel component, vehicle spoiler, a vehicle hood, an industrial product housing, or a consumer product housing.

16. The product of claim 14 wherein said glass microspheroids are present from 2 to 12 total weight percent of the formulation.

17. The product of claim 14 wherein said formulation further comprises a mold release agent.

18. The product of claim 14 wherein said formulation further comprises an alkyl ammonium bentonite nanocomposite clay.

19. The formulation of claim 14 wherein said particulate filler is only calcium carbonate.

20. The formulation of claim 1 wherein said particulate filler is kaolin clay.

21. The formulation of claim 14 wherein said particulate filler are both calcium carbonate and kaolin clay.

22. The formulation of claim 18 wherein said calcium carbonate and said alkyl ammonium bentonite nanocomposite clay are both present.

23. The formulation of claim 18 wherein said particulate filler is calcium carbonate and kaolin clay, and said alkyl ammonium bentonite nanocomposite clay is present.

24. The formulation of claim 1 wherein said alkoxysilane is one of:
3-aminopropyltrimethoxysilane, 3-aminopropyltriethoxysilane, 3-glycidoxypropyltrimethoxysilane, 3-glycidoxypropyltriethoxysilane, (3-glycidoxypropyl) bis(trimethylsiloxy)methylsilane, (3-glycidoxypropyl)methyldiethoxysilane, (3-glycidoxypropyl)dimethylethoxysilane, (3-glycidoxypropyl)methyldimethoxysilane, methacryloxymethyltriethoxysilane, methacryloxymethyltrimethoxysilane, methacryloxypropyldimethylethoxysilane, methacryloxypropyldimethylmethoxysilane, ethacryloxypropylmethyldimethoxysilane, methacryloxypropyltriethoxysilane, methoxymethyltrimethylsilane, 3-methoxypropyltrimethoxysilane, 3-methacryloxypropyldimethylchlorosilane, methacryloxypropylmethyldichlorosilane, methacryloxypropyltrichlorosilane, 3-isocyanatopropyldimethylchlorosilane, 3-isocyanatopropyltriethoxysilane, bis(3-triethoxysilylpropyl)tetrasulfide, or combinations thereof.

25. The formulation of claim 1 wherein said particulate filler comprises calcium carbonate.

26. The formulation of claim 14 wherein said alkoxysilane is one of:
3-aminopropyltrimethoxysilane, 3-aminopropyltriethoxysilane, 3-glycidoxypropyltrimethoxysilane, 3-glycidoxypropyltriethoxysilane, (3-glycidoxypropyl) bis(trimethylsiloxy)methylsilane, (3-glycidoxypropyl)methyldiethoxysilane, (3-glycidoxypropyl)dimethylethoxysilane, (3-glycidoxypropyl)methyldimethoxysilane, methacryloxymethyltriethoxysilane, methacryloxymethyltrimethoxysilane, methacryloxypropyldimethylethoxysilane, methacryloxypropyldimethylmethoxysilane, ethacryloxypropylmethyldimethoxysilane, methacryloxypropyltriethoxysilane, methoxymethyltrimethylsilane, 3-methoxypropyltrimethoxysilane, 3-methacryloxypropyldimethylchlorosilane, methacryloxypropylmethyldichlorosilane, methacryloxypropyltrichlorosilane, 3-isocyanatopropyldimethylchlorosilane, 3-isocyanatopropyltriethoxysilane, bis(3-triethoxysilylpropyl)tetrasulfide, or combinations thereof.

27. The product of claim 14 wherein said particulate filler comprises calcium carbonate.

* * * * *